Aug. 27, 1963   G. D. HUNTER ETAL   3,101,786
CENTER ENCLOSED DRIVE FOR ROD WEEDER
Filed June 7, 1961   2 Sheets-Sheet 1
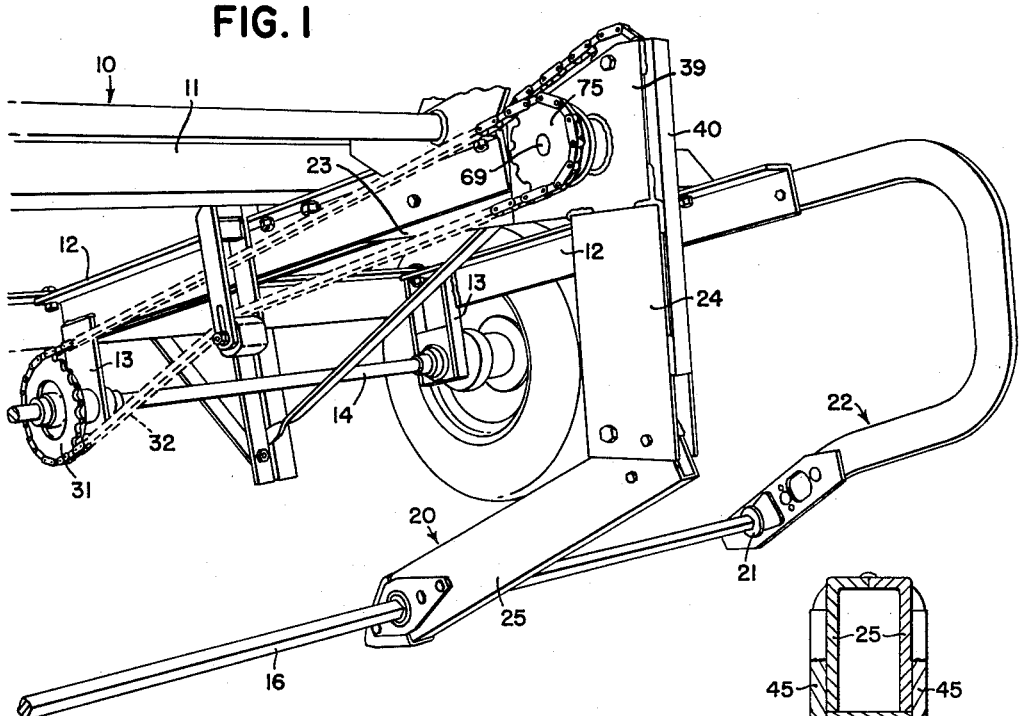
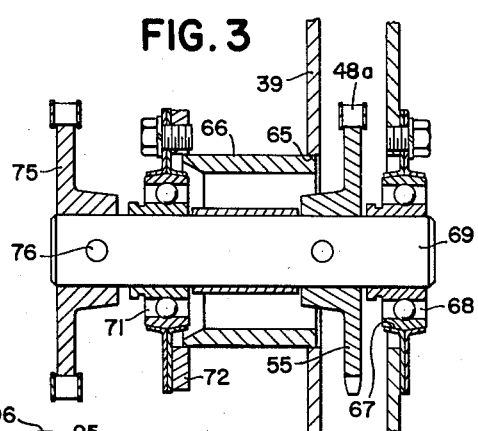
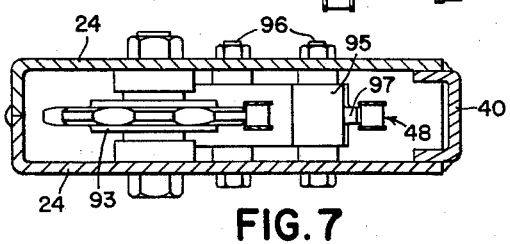
*INVENTORS.*
GEORGE D. HUNTER
WILLIAM W. JACKSON
BY
Roger C. Johnson
ATTORNEY

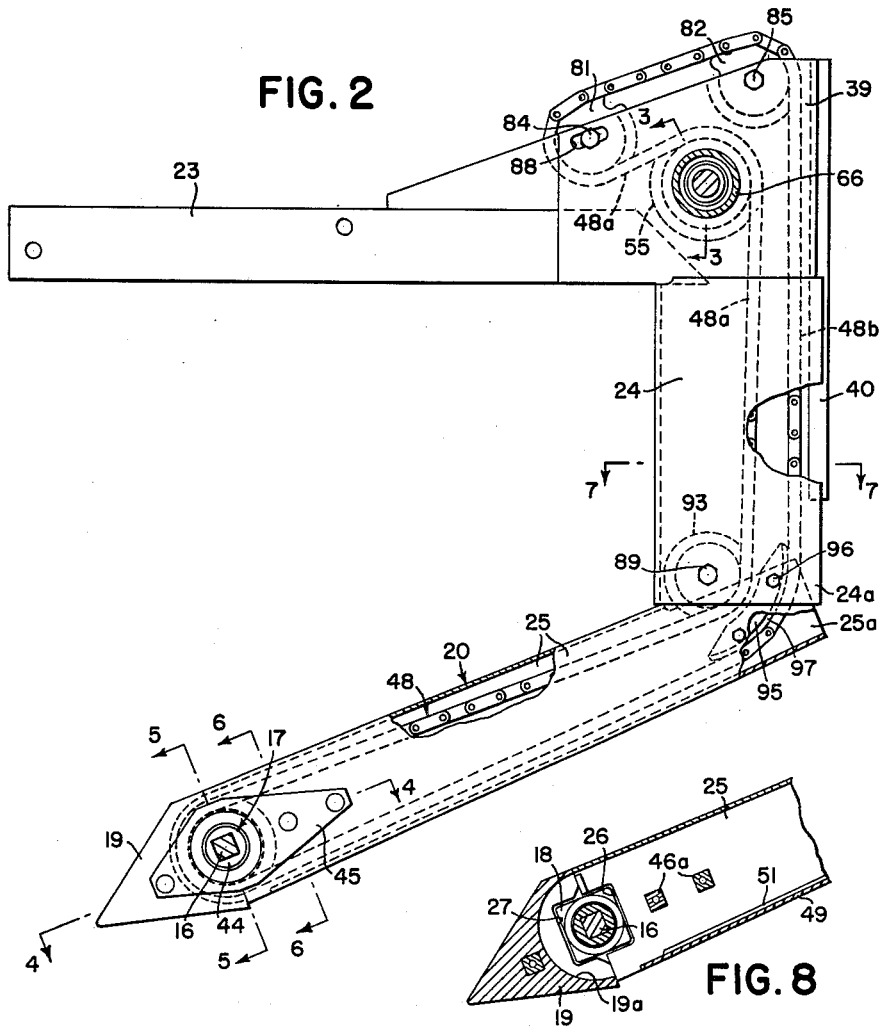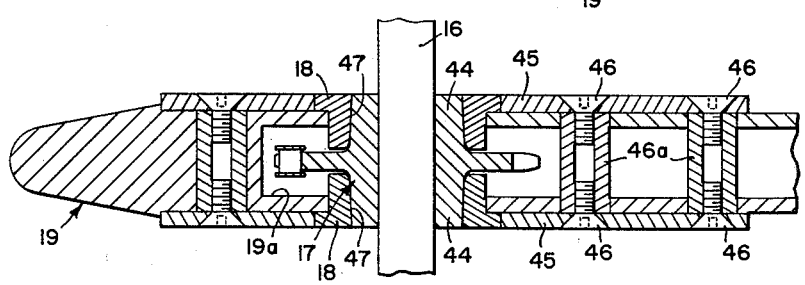

—

United States Patent Office 3,101,786
Patented Aug. 27, 1963

3,101,786
CENTER ENCLOSED DRIVE FOR ROD WEEDER
George Dwight Hunter, Des Moines, and William W. Jackson, Ankeny, Iowa, assignors to Deere & Company, Moline, Ill., a corporation of Delaware
Filed June 7, 1961, Ser. No. 115,439
1 Claim. (Cl. 172—44)

This invention relates generally to agricultural implements and more particularly to rod weeders, implements that are particularly designed to kill weeds in fallow ground maintaining a trashy cover against blowing and erosion.

The object and general nature of this invention is the provision of new and improved means for driving the ground-penetrating rotatable rod or shaft from one of the ground wheels of the implement without gathering trash or forming objectionable furrows in the ground.

More particularly, it is an important feature of this invention to provide rod driving means that is totally enclosed, thus protecting the drive means against abrasive action of soil and the like, but with the drive-enclosing means so constructed and arranged that furrowing and trash gathering are substantially eliminated. Specifically, it is an important object of this invention to provide a drive-enclosing rod-supporting pendant that is of gooseneck figuration which provides excellent trash-shedding action.

These and other objects and advantages of this invention will be apparent to those skilled in the art after a detailed description of the preferred construction, shown by way of illustration in the accompanying drawings, in which:

FIG. 1 is a fragmentary perspective view of a rod weeder in which new and improved drive-enclosing pendant means, embodying the principles of the present invention, have been incorporated.

FIG. 2 is a side view, at an enlarged scale and with certain parts in section, showing the rod driving means and the rod-supporting drive pendant that encloses the rod driving means.

FIG. 3 is a sectional view taken along the line 3—3 of FIG. 2.

FIG. 4 is a sectional view taken along the line 4—4 of FIG. 2.

FIG. 5 is a sectional view taken along the line 5—5 of FIG. 2.

FIG. 6 is a sectional view taken along the line 6—6 of FIG. 2.

FIG. 7 is a section taken along the line 7—7 of FIG. 2.

FIG. 8 is a fragmentary sectional view of the lower portion of the pendant.

Most rod weeders in use today are made up of a generally transverse frame means 10 that includes transverse and generally fore and aft extending frame angles 11 and 12, and associated other parts, such as brackets 13 in which an axle shaft 14 is journaled for rotation, the ends of the axle shaft receiving suitable supporting wheels drivingly connected with the shaft 14. The rod weeder also includes a transversely arranged square shaft or rod 16 supported by a lower sprocket 17 (FIGS. 4 and 5) carried for rotation in a pair of center boot bearings 18 carried by a shoe 19 at the lower forward end of a center gooseneck drive pendant 20. Laterally outwardly of the center pendant 20, the weeder rod 16 is rotatably supported in suitable bearings 21 carried by shoes fixed to the outer conventional pendants 22. The center drive pendant 20 has upper horizontal portions 23 affixed in any suitable way to the frame means 10, rear generally vertically extending laterally spaced apart plate portions 24 (FIG. 7), and forwardly extending lower pendant portions 25 secured to the lower ends of the vertical portions. The forward ends of the lower pendant portions 25 are notched, as at 26, to receive the square flange portions of the bearings 18 mentioned above as carrying the weeder rod 16. The notches 26 are disposed opposite similar notches 27 formed in the shoe 19.

The implement ordinarily is operated so that the rod moves just under the surface of the ground and at the same time is rotated in a direction to pull up weeds and push clods to the surface of the ground to form a firm weed-free seedbed while leaving trash on the surface of the ground to protect the latter from blowing, erosion, and the like.

According to this invention, the weeder rod 16 is driven from the axle shaft 14 by means that enclose the drive parts within the drive pendant but which are shaped substantially similar to the shape of the conventional shaft-supporting pendants 22, that is, having a lower forwardly extending portion supporting the weeder rod and arranged at a small angle to the horizontal, whereby there is little or no tendency to catch and drag trash and the like along with the implement. The present invention is also particularly concerned with the rod-driving means and the latter will now be described in detail.

Referring first to FIG. 1, a sprocket 31 is mounted on the axle shaft 14 adjacent one of the brackets 13 which supports the shaft, and a chain 32 is trained over the sprocket 31 and extends rearwardly alongside one of the fore-and-aft extending frame angles 12 to a point adjacent the rear of the machine. The gooseneck drive pendant 20 enclosing the rod-driving means includes, among other things, the lower forwardly extending portions 25, the generally vertical portions 24 and the latter are connected at their lower portions with the rear ends of the horizontal portions 25. The juncture between the upper horizontal sections 23 and the rear generally vertical sections 24 is reenforced by a pair of laterally spaced apart generally vertical longitudinally extending plates 39. The space between the rear ends of the plates 39 and between the rear edges of plates 24 is closed by a bar 40 welded or otherwise secured in position. The plates 39 are also welded to the plates 24. The rear portions of the plates 24 and 25 have spaced apart sections 24a and 25a (FIG. 2) that receive a chain guide block 95( FIG. 7) to which reference will be made below.

The generally forwardly extending pendant section 25 is shaped to extend downwardly at a slight angle with respect to the horizontal substantially in matching angularity with respect to the associated conventional pendant section 22. The center boot bearings 18 are disposed so as to fit in the spaces or notches 26 and 27 and are held in place by apertured plate-like supports 45 fixed to opposite sides of the lower forward pendant portion by pairs of flat head socket screws 46 threaded into spacers 46a. The shoe 19 is hollowed out, as at 19a, to receive the sprocket 17. The hub portions 44 of the rod-driving sprocket 17 are disposed in apertures 47 in the bearings 18. The sprocket 17 receives a driving chain 48 that is disposed within the hollow pendant section formed by the plates 25. The space between the lower edges of the plates 25 is closed by a bottom strip 49 which carries on its inside face a chain guide rod 51 welded thereto. The chain 48 extends rearwardly through the lower forwardly extending pendant section 25 and then upwardly through the vertical pendant section 24, as will be clear from FIG. 2.

At its upper portion one flight 48a of the chain 48 passes over a driving sprocket 55. As will best be seen from FIG. 3, one of the plates 39 is apertured, as at 65, and fixedly receives a short sleeve 66 that at its inner end is welded to the adjacent plate 39. In axial alinement with the sleeve 66 the other plate 39 is apertured, as at 67, to receive bearing means 68 that receives one end of a short shaft 69. The other end of the shaft 69 is carried by bearing means 71 supported by the outer end of the sleeve 66 by means of a flange 72 that is welded to and forms a part of the sleeve 66, the bearing means 71 being fixed to the flange 72 in any suitable way. The shaft 69 extends outwardly beyond the bearing means 71 and receives an exterior sprocket 75 that is pinned, as at 76, to the shaft 69. Within the plates 39, the shaft 69 carries the driving sprocket 55 around which a portion of the forward flight 48a of the chain is trained, as mentioned above. At the upper end of the chain 48, the latter passes over a pair of idlers 81 and 82 journaled by a suitable bearing means on shaft members 84 and 85 carried by the upper edge portions of the plate 39, the shaft 84 being mounted in slots 86 so as to be adjustable for maintaining the chain 48 in the desired degree of tautness.

As well best be seen from FIG. 2, the flights 48a and 48b of the chain 48 are supported by suitable means where the chain passes around the junction between the hollow vertical pendant section 24 and the hollow forwardly extending pendant section 25. At this point, a cross shaft 89 receives a chain supporting idler 93, the idler 93 supporting the tension flight 48a and located so that a portion of the tension flight extending from the rod sprocket 17 to the idler 93 extends within the hollow pendant section 25 in a straight line, and from the idler 93 to the drive sprocket 55 the tension flight 48a extends in a straight line upwardly in the hollow pendant section 24 and passes around the sprocket 55 and the associated idlers 81 and 82. As will be seen from FIG. 2, rotation of the driving sprocket 55 in a counterclockwise direction acts through the tension flight 48a to drive the rod sprocket 17 and the weeder rod 16 connected therewith.

The slack flight 48b of the drive chain 48 passes around a curved block member 95 forming a drive chain track, the block 95 being securely fixed to the associated pendant sections by bolts or other fasteners 96. The block 95 comprises a part that is provided with a narrowed portion 97 that contacts the rollers of the chain 48. The lower run of the slack flight 48b is guided by the rod 51.

The exterior sprocket 75 (FIG. 3) is driven by a chain 32 that extends forwardly therefrom and is trained over the sprocket 31 on the axle shaft 14. Thus, rotation of the ground wheels act through the chain 32 and the shaft 69 to drive the rod-rotating chain 48.

While we have shown and described above the preferred structure in which the principles of this invention have been incorporated, it is to be understood that our invention is not to be limited to the particular details, shown and described above, but, in fact, widely different means may be employed in the broader aspects of our invention.

What we claim, therefore, and desire to secure by Letters Patent is:

A rod weeder comprising: ground-engaging wheel supported frame means; a plurality of gooseneck pendants fixed to said frame means, each pendant including a downwardly extending rear section and a lower forwardly extending section; a bearing shoe fixed to the forward end of each lower forwardly extending section, a weeder rod extending through all of said bearing shoes; at least one of said pendants being a drive pendant having a generally vertical hollow section, an upper pendant portion, and a lower forwardly extending hollow section; the upper pendant portion comprising a pair of laterally spaced apart plates fixed to the upper portion of said vertical pendant portion, one of said plates having an opening, the other plate supporting a first bearing means in alignment with said opening in said one plate, a sleeve fixed at its inner end to the outer side of said one plate concentric with said opening, a second bearing means carried at the outer end of said sleeve, a shaft journaled in said first and second bearing means and extending outwardly of the outer end of said sleeve, a first sprocket fixed to the outwardly extending end of said shaft, a second sprocket fixed to said shaft between said plates, and a pair of idlers journaled between said plates; said lower forwardly extending hollow section being jointed in its rear portion with the lower portion of said vertical hollow section, the associated shoe receiving spaced apart bearing portions, a rod-driving sprocket fixed nonrotatably to said weeder rod between said spaced apart bearing portions; a drive chain disposed within said drive pendant and having a tension flight and a slack flight, one end of said chain being disposed about said rod-driving sprocket and the other end of said chain being trained over said second sprocket and said idlers; chain guide means disposed at the juncture of said vertical and lower hollow sections, said guide means comprising a first guide engageable by said tension flight, a second guide disposed between said slack flight and said tension flight, said second guide having a stationary narrowed curved guide surface engageable only by the central portion of said slack flight, said guide surface having a radius of curvature in excess of one-half the distance between said first guide and said stationary guide surface; and drive means interconnecting said first sprocket with said ground-engaging wheel means.

References Cited in the file of this patent
UNITED STATES PATENTS

| | | |
|---|---|---|
| 1,176,883 | Crawford | Mar. 28, 1916 |
| 2,318,097 | Richmond | May 4, 1943 |
| 2,725,006 | Richmond | Nov. 29, 1955 |
| 2,886,113 | Sorenson et al. | May 12, 1959 |
| 2,892,504 | Mowbray | June 30, 1959 |